Feb. 12, 1963  R. T. DIVERS  3,077,515
ELECTRICAL CONNECTORS
Filed June 29, 1959

INVENTOR.
RAYMOND T. DIVERS
BY
Herman Seid
ATTORNEY.

United States Patent Office 3,077,515
Patented Feb. 12, 1963

3,077,515
ELECTRICAL CONNECTORS
Raymond T. Divers, Camillus, N.Y., assignor to Carrier Corporation, Syracuse, N.Y., a corporation of Delaware
Filed June 29, 1959, Ser. No. 823,619
7 Claims. (Cl. 174—151)

This invention relates to electrical connections, more particularly to means for connecting a high voltage conductor externally of said housing, without requiring a terminal lead through block.

A variety of situations exist in which it is necessary to connect two electrical conductors, simultaneously insuring that there will be no surface current leakages from the conductor along the surfaces of the insulators between the connection of these conductors, to a ground. The mere positioning of insulation over the splice between the two joined conductors is not adequate at high voltages, since at the surface boundaries between the spliced insulation and the conductor insulation, current passage is encountered. In addition to the problems involved in preventing current leakage between the bounds of adjacent insulation layers on high voltage current conductors, where these current conductors pass through fluids under pressure, the effects of the fluid on the insulation must also be mitigated in order to prevent undesirable stray currents or short circuits. Thus where motor power connections must be made in sealed motor compressor units as employed in high capacity refrigeration systems, the high voltage current leads to the sealed motor must be joined to supply cables in a way which will prevent current leakage from these leads and cables to the motor-compressor housing. Further problems are encountered in conjunction with compressor motor installations in that it is desirable that any connectors employed occupy a minimal volume so as not to require an increase in the size of the housing enclosing the motor-compressor, as results from the use of conventional terminal lead through blocks.

It is with the above problems in mind that the present means have been evolved, means permitting the electrical connection of two high voltage conductors, one of said conductors extending through a fluid medium under high pressure. The novel connection between the conductors prevents the passage of any stray current between the insulation normally provided about said conductors, and further results in a negligible volumetric increase in the space requirements of the conductors.

It is accordingly a primary object of this invention to provide improved connecting means for joining two electrical conductors.

An additional object of the invention is to provide a connector for electrical conductors which substantially eliminates the possibility of current flow between the surface boundaries of the insulation surrounding said conductors.

It is also an object of this invention to provide a novel connector for use in joining two electrical conductors, with said connector producing a minimal increase in volume of the insulated conductor.

A further object of the invention is to provide a novel electrical connector for joining electrical conductors, with said connector being simple in manufacture and use.

Another object of the invention is to permit the making of electrical connections between a conductor in a housing and one externally of the housing without requiring the use of a terminal lead through blocks.

These and other objects of the invention which will become apparent from the following description and claims are achieved by provision of a two element mechanical coupling, and an insulating sleeve arranged to extend over the splice formed between the two joined conductors. One of the coupling elements is bonded to the insulation about one of the conductors, and the other of the coupling elements is bonded to the sleeve. Thereafter upon joining the coupling elements, the splice formed between the conductors will be covered by an insulting layer in which the length of surface path between the splice and any available ground will be such as to preclude the possibility of passage of current along the insulation surface. The insulating sleeve will preferably be formed of a material impermeable to the fluid through which the conductors must pass, and the length of the sleeve will be such as to preclude the possibility of current leakage, or fluid leakage, between the splice enclosed by said sleeve and the exterior surface of the insulation. Where the electrical connections are made in conjunction with a sealed motor-compressor, the use of nylon in the formation of the tube and coupling is found to give desirable results.

A primary feature of the invention resides in the fact that the dimensions of the connector forming an electrical connection between two conductors are substantially coextensive with the surface boundaries of the normally employed insulation as measured from the conductor, so that there will be no increase in the volumetric requirements, thereby permitting the ready formation of an electrical connection to the motor lead lines of a sealed motor driven unit such as a refrigerant motor compressor without increasing the volumetric requirements of the housing of said motor compressor.

Another feature of the invention resides in the fact that by the use of a simple sleeve, the length of available surface path between the splice and a possible ground may be such as to prevent current leakage.

The specific structural details of the invention, and their mode of functioning, will be made most manifest and particularly pointed out in clear, concise and exact terms in conjunction with the accompanying drawings, wherein.

Referring now more particularly to the drawings, like numerals in the various figures will be employed to designate like parts.

Figure 1:
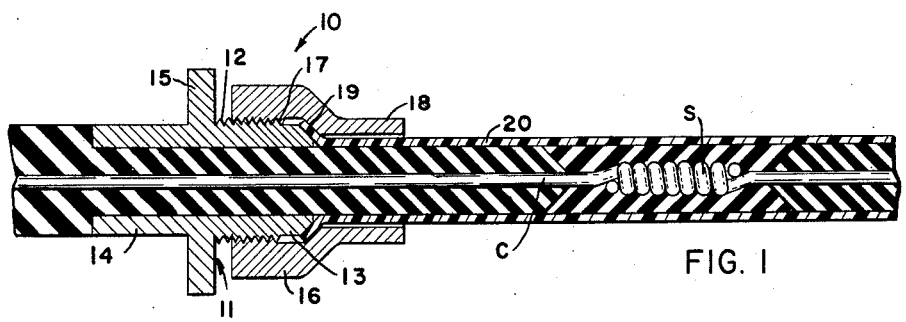
FIGURE 1 is a cross sectional view through a connection formed between two insulated electrical conductors by employing the novel means of this invention.

As best seen in FIGURE 1, the novel connector 10 is seen to comprise a two element coupling 11. Coupling 11 is shown as formed by a flanged fitting 12 having a male threaded portion 13 and a body portion 14 separated by flange 15. A flare nut 16 having an internally threaded female portion 17 and a reduced body portion 18 is provided for connection to fitting 12. An internal recess 19 for a purpose to be made hereinafter more apparent is provided within tapered portion 18 of flare nut 16.

A sleeve 20 formed of a suitable non-conducting material is provided having an internal diameter substantially equal to the external diameter of the insulation formed about the conductors to be connected. The external diameter of sleeve 20 is such as to make sleeve 20 a relatively thin walled member, merely sufficient to provide desired structural rigidity, fluid impermeability, and electrical insulation, depending on the environment through which the conductors are to be passed and the magnitude of the currents carried thereby.

Figure 2:
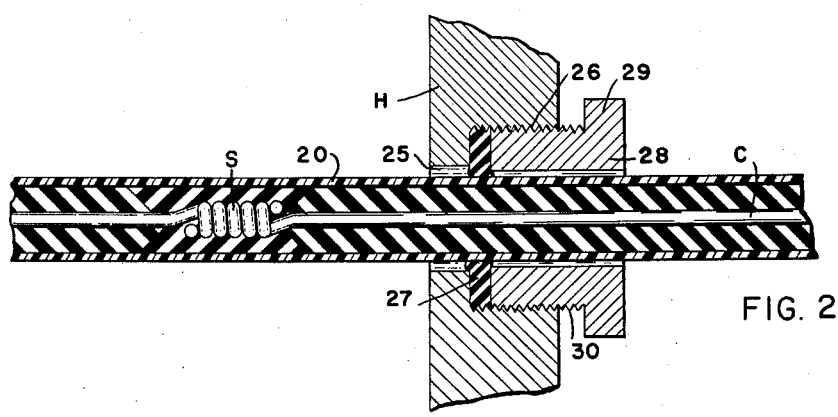
FIGURE 2 is a cross sectional view through a housing through which the connected conductors pass illustrating a suggested arrangement for sealing the housing with respect to the conductors.

In the arrangement illustrated in FIGURE 2, a suggested means for passing the connected insulated conductors through the wall of a housing H is illustrated. In this arrangement an aperture 25 of a diameter sufficient to permit free passage therethrough of the conductor is provided in housing H. The exterior surface of the housing is recessed to provide tapped recess 26 of a diameter larger than that of aperture 25. Within tapped recess 26 a compressible ring member 27 formed of a suitable packing material is provided and a compression fitting 28 formed with flange 29 and threaded body portion 30 is provided for insertion in recess 26 over packing 27.

Figure 3:
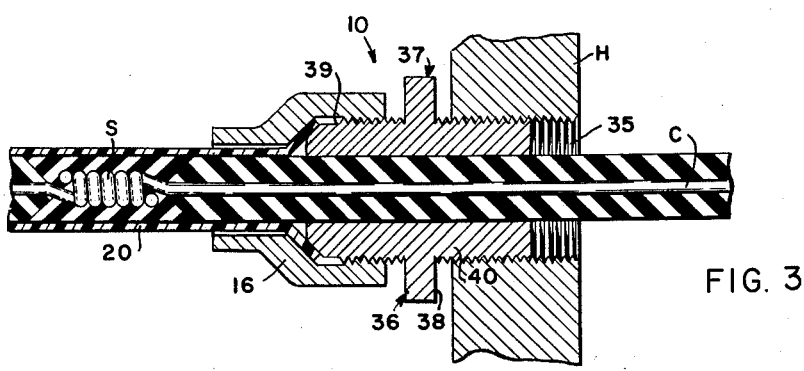
FIGURE 3 is a cross sectional view similar to FIGURE 2 illustrating an alternative mode of sealing the insulated conductors in their passage through the housing wall.

In FIGURE 3 is shown a variation of the seal disclosed in FIGURE 2 in which the two element coupling employed in forming connector 10 aids in the formation of the seal about the insulated conductor extending through the housing H. In this arrangement, a tapped aperture 35 is formed through housing H, and a two element coupling 36 similar to coupling 11 is employed. Coupling 36 comprises a flared nut 16 as illustrated in FIGURE 1. However, the flanged fitting 37 mating with flare nut 16 is formed with a flange 38, a threaded nut engaging portion 39 and a threaded housing engaging portion 40 as best seen in the drawing.

The aforedisclosed structural components are found particularly suitable in the formation of an electrical connection between two insulated conductors where the conductors are employed for carrying a high voltage current to equipment contained within a seal housing usually containing a fluid atmosphere under relatively high pressures. Where so employed, a conventional splice S is formed between the insulated conductors to be joined at the desired junction point by exposing the conductors and joining them in any desired fashion, either by twisting or mechanically clamping. A suitable insulating splice covering, for example, self-vulcanizing silicone rubber tape, epoxy bonded mica flake tape, polyvinyl chloride electrical tape, etc., is then secured about the exposed conductors at the splice.

As viewed in FIGURES 1 and 3, one of the elements (the male in the drawings) of the two element coupling is bonded to the insulation of one of the conductors adjacent the splice to form a unitary structure of the male element and the insulation. Suitable plastics such as nylon, acrylic, or the like are found to be readily bondable to conventionally employed electrical insulating materials. A sleeve formed of non-conducting material, and impervious to the fluid atmosphere through which the conductor is passed is extended over the splice, and abutting the free end of the male coupling element previously bonded to the insulation. The other element (the female in the drawing) of the coupling which has been positioned over the conductors prior to formation of the splice is then engaged with the male element and compresses the abutting end of the sleeve against the nut engaging threaded portion of the male coupling element, thus securing the sleeve in insulating position over the splice.

The electrical connection formed as a result provides a relatively long path between the splice and any possible exterior ground along the surface of the insulation, since the length of the tube may be selected of any desirable length to preclude such surface current transmission. Additionally the tubing is made of a material impervious to the fluid atmosphere surrounding the conductors so that conventional splice insulating materials may be employed. The increase in volume resulting from the connection is negligible since the components of the connector have an exterior diameter only slightly larger than that of the exterior diameter of the insulating conductors.

Where the novel connecting means are utilized in connection with a motor compressor unit enclosed in housing H, as illustrated in FIGURES 2 and 3, the motor lead coming from the left of the figures may readily be connected to a power supply cable coming from the right in the figures by use of the novel connecting means. Use of the novel connector 10 permits leading of the connected conductor through the wall of housing H, without requiring bulky terminal lead through blocks.

In the FIGURE 2 embodiment, the splice will be formed on the inside of the compressor housing (to the left as viewed in the drawing) and the power cable C along with sleeve 20 will be extended through aperture 25 to the exterior of housing H. Packing 27 and compression fitting 28 are placed in position in recess 26 and fitting 28 is screwed down over the packing to form a substantially fluid tight seal about sleeve 20 and its associated cable C. It will be apparent that the compressive action of fitting 28 serves to force packing 27 against cable C. It is thus seen that a simple inexpensive compression fitting may be used as a seal about the point where the tube protected power cable leaves the compressor housing rather than the normally used expensive and space consuming terminal lead through block normally required in conjunction with high voltage equipment.

Where the arrangement illustrated in FIGURE 3 is employed the connected conductors are led through housing H by use of the male element of coupling 36 suitably bonded to the insulation of the power cable C, and extended through housing H. A conventional splice is formed between power cable C and the motor lead (not shown) and sleeve 20 is extended over the splice in abutting relationship with the nut engaging portion 39 of element 38. Subsequent engagement of flared nut 16 which has been positioned over the conductors prior to the formation of the splice serves to form a secure bond between tube 20 and male element 37, with tube 20 enclosing the splice and preventing the passage of current from the splice to housing H.

It is thus seen that a simple inexpensive means has been provided for effecting electrical connections between two conductors, and implementing the lead through of the connected conductors through a housing wall. The novel connection permits the passage of the connected conductors through the wall of a housing without requiring terminal lead through blocks and serves further to substantially prevent current travel along the insulation surface, and additionally permits protection of the splice insulation from any deleterious efforts of any fluids in the housing.

The above disclosure has been given by way of illustration and elucidation, and not by way of limitation, and it is desired to protect all embodiments of the herein disclosed inventive concept within the scope of the appended claims.

I claim:

1. Means for forming an insulated electrical connection between two spliced insulated electrical conductors, said means comprising: a coupling member secured to the insulation of one of the conductors; sleeve means surrounding the splice and extending into abutting relationship with said coupling member, and a second coupling member engageable with said first coupling member and arranged to compress the abutting end of the sleeve means against said first coupling member whereby the length of the surface path from the splice to an exposed surface of the insulation is a function of sleeve length.

2. Means as in claim 1 in which said first coupling member is bonded to the insulation of one of the conductors.

3. A method of forming an electrical connection between two insulated conductors and leading the connected conductors through a wall of a housing, said method comprising the steps of exposing the conductors at the desired junction; securing a coupling element to the insulation of one of the conductors; forming a splice between the conductors at the desired junction; extending a sleeve over the conductors about the splice; providing a coupling element about the sleeve; joining the last named coupling element to the first named coupling element to maintain the sleeve in insulating position over the splice; passing the sleeve and conductor covered thereby through the wall of the housing; and providing a compression fitting about the sleeve at its point of passage through the housing.

4. A method of forming an electrical connection between two insulated conductors and leading the connected conductors through a wall of a housing, said method comprising the steps of exposing the conductors at the desired junction; bonding a coupling element to the insulation of the conductor within the housing; forming a splice between the conductors within the housing; extending a sleeve over the conductors about the splice; providing a coupling element about the sleeve; forming an aperture in the housing through which the conductor may extend and of a size to permit insertion therein of a part of the first named coupling element; joining the last named coupling element to the first named coupling element to maintain the sleeve in insulating position over the splice, and engaging a part of the first named coupling element in the aperture.

5. A connector for insulatedly coupling two spliced insulated electrical conductors, said connector comprising: a mechanical coupling consisting of two separate conjoinable parts positioned over the conductors; one of said parts being secured to the insulation of one of said conductors and a sleeve extending over the splice and the conductor insulation, said sleeve arranged to fit in tight engagement within the other of the parts of said coupling and abut said one part of said coupling, whereby upon conjoining of the parts of said coupling over the conductor the length of the surface path from the splice to an exposed surface of the insulation is a function of sleeve length.

6. A connector as in claim 5 in which said coupling comprises: a fitting having a male portion; and a flare nut having an internally threaded female portion and an internal recess in which said sleeve is compressed against the male portion.

7. Means for insulatingly connecting two spliced insulated electrical conductors and leading the connected conductor through a wall aperture in a fluid tight insulated fashion comprising a coupling member mounted on and surrounding the insulation of one of the conductors, sleeve means surrounding the splice, and a second coupling member engageable with the first coupling member, said second coupling member being secured to the insulation of one of the conductors, the sleeve means extending into abutting relationship with the second coupling member, said second coupling member serving to compress the abutting end of the sleeve means against the first named coupling member, said second coupling member extending through the wall aperture and forming a substantially fluid tight seal about the conductors passing therethrough.

References Cited in the file of this patent

UNITED STATES PATENTS

| | | |
|---|---|---|
| 1,836,571 | Breetz | Dec. 15, 1931 |
| 2,449,983 | Devol | Sept. 28, 1948 |
| 2,460,304 | McGee et al. | Feb. 1, 1949 |
| 2,564,302 | Fraser | Aug. 14, 1951 |
| 2,655,638 | Allen | Oct. 13, 1953 |
| 2,673,233 | Salisbury | Mar. 23, 1954 |
| 2,719,876 | Hennessey et al. | Oct. 4, 1955 |
| 2,866,957 | Raypholtz | Dec. 30, 1958 |
| 2,958,722 | Rubin et al. | Nov. 1, 1960 |

UNITED STATES PATENT OFFICE
CERTIFICATE OF CORRECTION

Patent No. 3,077,515                    February 12, 1963

Raymond T. Divers

It is hereby certified that error appears in the above numbered patent requiring correction and that the said Letters Patent should read as corrected below.

Column 3, line 32, for "seal" read -- sealed --; column 6, line 22, for "through" read -- into --.

Signed and sealed this 8th day of October 1963.

(SEAL)
Attest:

ERNEST W. SWIDER
Attesting Officer

EDWIN L. REYNOLDS

Acting Commissioner of Patents